July 7, 1964 A. M. MAROTH 3,139,771

SPEED-CHANGE MECHANICAL TRANSMISSION

Filed Feb. 1, 1962 2 Sheets-Sheet 1

INVENTOR
Arthur M. Maroth
BY
H. Gibner Lehmann
AGENT

INVENTOR.
Arthur M. Maroth
BY
H. Gibner Lehmann
AGENT

United States Patent Office 3,139,771 Patented July 7, 1964

3,139,771

SPEED-CHANGE MECHANICAL TRANSMISSION

Arthur M. Maroth, % Maroth Engineering Co., Grumman Hill Road, Wilton, Conn.

Filed Feb. 1, 1962, Ser. No. 170,455
11 Claims. (Cl. 74—800)

This invention relates to mechanical transmissions, and more particularly to transmissions of the type which effect a change of speed by use of a nutating, non-turning part.

The present invention concerns improvements in the mechanical transmission described and claimed in my copending application Serial No. 89,486, filed February 15, 1961, and entitled "Mechanical Transmission," now abandoned.

In the transmission of this copending application there is provided a driven member having a set of spaced driven faces disposed in a circle and constituted of groups of roller bearings, together with a nutating, non-turning driving member which has spaced driving faces also disposed in a circle and cooperable or engageable sequentially with the driven faces of the driven member. The application or transmission of force from the driving to the driven member occurs along an arc which is at all times less than 180°, and accordingly the application of force to the driven member is in the nature of an unbalanced action, since there are no supplementary forces balancing the said driving force and which could be located directly opposite said driving forces with respect to the axis of the driven member.

Other speed-changing transmissions of the nutating type have been proposed in the past, involving gear teeth instead of the anti-friction rollers of the mechanism of my copending application. However, all of these prior speed change transmissions operate in the unbalanced manner mentioned above by applying an unbalanced driving force to the driven member, with the arc of application of such force being always less than 180° whereby the force is always applied wholly to one side of the axis of the driven member.

These prior transmission patents in many cases involve a driven member which is in the form of a bevel gear, and involve a nutating driving member also in the form of a bevel gear, there being two sets of teeth disposed back-to-back on the driving member and the additional set being for the purpose of preventing turning of such driving member. This purpose is accomplished by the provision of another bevel gear member which is stationary and which is coaxial with and spaced from the first-mentioned (driven) bevel gear member whereby the engagement of the nutating driving member with the two, spaced coaxial bevel gear members (one driven and the other stationary) occurs at substantially diametrically opposite zones or areas. However, in each such instance the driven member does not experience balanced driving forces, but instead is subjected to forces which are wholly at one side of the axis, at any instant.

An object of the present invention is to provide a novel and improved mechanical speed-change transmission of the class outlined above, wherein complete balance is had and at the same time greater efficiency and less friction. By such organization the transmission is capable of higher speeds, has less vibration, can handle more power and be of lighter weight and smaller size. It is further capable of continuous duty with less heating and less demands as to lubrication, all of the above constituting important objects and features of the invention.

All this is accomplished, in accordance with the invention, by the provision of a novel organization wherein the driven member is constituted of two axially spaced, oppositely-located parts, and wherein the driving, nutating member is interposed between the two said parts of the driven member and applies substantially equal driving forces to both of the same along arcuate zones or areas which are at all times generally diametrically opposite each other. By such construction, driving forces which are applied to the driven member by the nutating driving member are balanced and of a supplementing nature, resulting in a greatly improved and smoother action, with the forces more widely distributed and with a corresponding greater power handling capacity.

Additionally, the invention provides an organization wherein other balanced forces are used on the nutating driving member to hold the same or prevent its rotation while at the same time permitting it to have an orderly, cyclic wobbly movement, thereby complementing the balanced-force system involving the driving and the driven members.

By the present invention the balanced-force detent or holding means acting on the nutating driving member comprises a pair of coaxial members spaced axially from each other and having undulating opposed faces, said holding members being located on opposite sides of the nutating member and the latter having back-to-back sets of undulating faces adapted for engagement respectively with the faces of the holding members. Thus at any instant the holding forces which are applied to the driving member to prevent turning thereof will be divided and located at diametrically opposite points or areas with respect to the axis of the transmission, resulting in a balanced detent system.

A further feature of the invention resides in the provision of a unique and advantageous symmetrical construction whereby the axially spaced holding members are located within or inward of the sets of driven faces, and the latter are rigidly interconnected by an annular circumferential ring within which the nutating driving member is disposed. Such disposition of the essential operative components of the transmission results in a compact device which requires a minimum amount of space both axially and radially.

Another feature of the invention resides in the provision of anti-friction roller elements which constitutes the driving faces of the driving or nutating member whereby both the said parts of the driven member may have simple wedge pieces or teeth without anti-friction or roller means, constituting the driven faces. This reduces considerably the number or amount of roller or bearing elements involved with the transmission of force from the nutating member to the driven member.

Other features and advantages will hereinafter appear.

In the drawings accompanying this specification, similar characters of reference are used to designate like components throughout the several views, in which.

Figure 1:
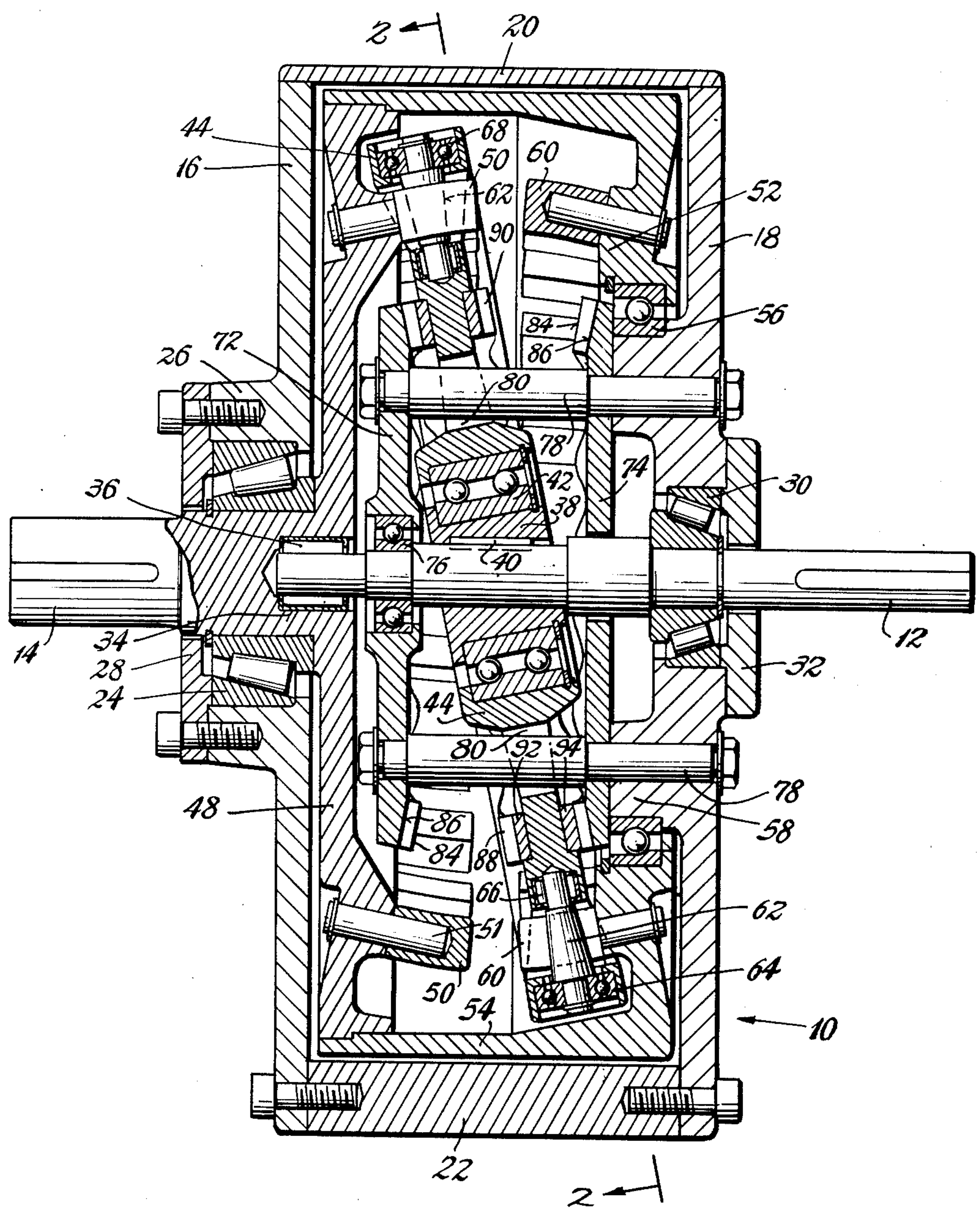
FIG. 1 is an axial sectional view of the improved speed-changing transmission as provided by the invention.

Referring now to the drawings, the speed changer device shown therein comprises a stationary cylindrical casing 10 from which there project a high-speed drive shaft 12 and a low-speed driven shaft 14. The casing 10 comprises circular end plates 16 and 18 which are secured together in spaced relation, as by a semi-circular cover and spacer part 20 and a supplementing semi-circular spacer part 22 together with suitable screws, as indicated.

The driven shaft 14 is carried by an anti-friction bearing assemblage 24 located in a hub 26 of the end plate 16, such assemblage being located in place by a bearing retainer plate 28. The drive shaft 12 is carried by an anti-friction bearing assemblage 30 located in and at the center of the end plate 18, such assembly being secured in place by a bearing retainer plate 32. The drive shaft 12 passes entirely axially through the casing 10 and at its inner end is mounted for rotation within a socket or recess 34 provided in the inner end of the driven shaft 14, by means of an anti-friction bearing assemblage 36.

Within the casing 10 the drive shaft 12 has an oblique drive hub 38 secured in place by a key 40, the said hub carrying an anti-friction bearing assemblage 42 on which there is rotatably mounted a circular nutating drive member 44. By such organization, turning of the drive shaft 12 will impart an orderly cyclic wobbly or nutating movement to the drive member 44, as will be readily understood.

In accordance with the present invention the nutating non-rotating movement of the drive member 44 imparts balanced, diametrically opposite driving forces to the drive shaft 14 at diametrically opposite points or areas at any instant, in a manner to effect a great speed reduction while avoiding highly concentrated off-center forces located solely at one side of the transmission axis, at any moment. Thus, greater loads may be handled by the speed changer for a given size of unit, and the changer may operate at appreciably higher speeds without excessive heat, vibration, wear or inertial resistance. Further, it may be of smaller size and lighter weight.

In effecting such application of balanced forces there is provided within the casing 10 a two-part driven member which is affixed to the driven shaft 14 to impart movement thereto. One of the parts of such driven member is indicated at 48, having a disk-like or wheel-like shape and carrying a set of wedge teeth 50 which are disposed in a circle about the axis of the shafts 12 and 14 and are located to extend angularly outward as seen in FIG. 1. The teeth 50 may be secured in any desired manner, being shown as mounted on short pins 51 which are fastened in suitable bores in the part 48 of the driven member. As illustrated, the part 48 may be formed integral with the driven shaft 14. The driven member also has a second part 52 which is in the form of a ring having an axially extended flange or annulus portion 54 disposed closely adjacent the cylindrical wall portion of the casing 10 and extending to the driven part 48 for rigid securement thereto. Thus, the driven member essentially comprises the disk-like part 48, the circumferential connecting or joining flange 54, and the ring-like part 52. The part 52 of the driven member is mounted by means of an anti-friction bearing assemblage 56 on an internal hub 58 of the end plate 18, and has a set or plurality of wedge pieces or teeth 60 which are similar to the teeth 50, having an annular disposition as shown. As an example, there may be 21 of the wedge teeth 50 and 21 of the wedge teeth 60 in a given transmission.

For cooperation with the wedge teeth 50 and 60 there is provided on the nutating drive member 44 a set or plurality of circumferentially spaced inclined driving faces in the form of tapered shafts 62 which are carried by anti-friction bearing assemblages 64 and 66 in peripheral portions of the drive member.

Figure 2:
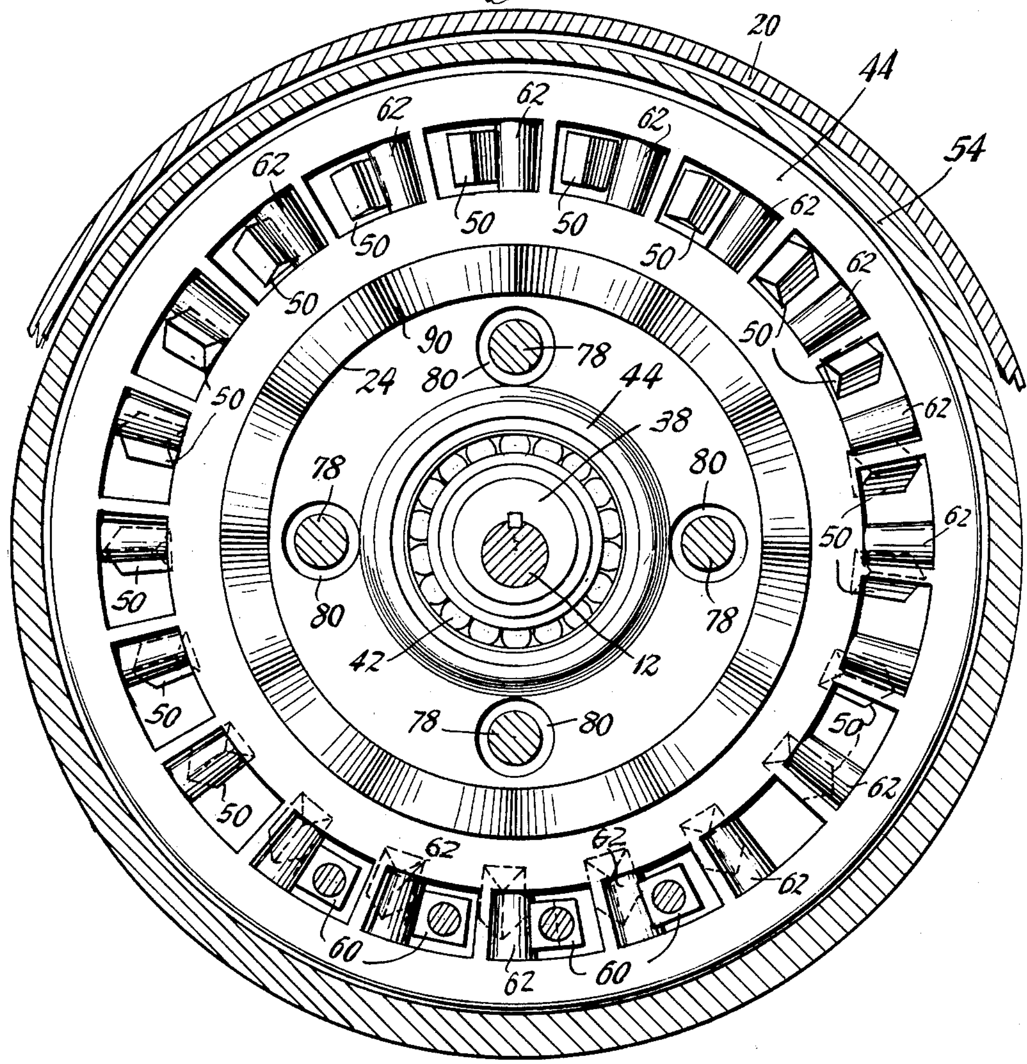
FIG. 2 is a transverse section taken on the line 2—2 of FIG. 1.
Figure 3:
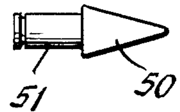
FIG. 3 is an edge view of one of the wedge teeth, of the transmission.

As seen in FIG. 2, the drive member 44 has an annular peripheral portion 68 provided at intervals with sockets or recesses in which the bearing assemblages 64 are mounted. Clearance space is provided on all sides of the tapered driving shafts, 62, to accommodate the wedge teeth 50 and 60 as the drive member goes through its cyclic, wobbly movement. A total of 20 of the shafts 62 may be provided on the drive member 44 for cooperation with the 21 wedges 50 and 21 wedges 60 provided respectively on the parts 48 and 52 of the driven member.

It will now be understood that, when the drive member 44 has imparted to it an orderly wobbly motion while at the same time it is restrained from turning about the axes of the transmission, the shafts 62 will sequentially engage the wedge teeth 50 and 60 at diametrically opposite areas with respect to the axis of the transmission, at any instant. For example, as seen in the upper portion of FIG. 1, a tapered shaft 62 is fully engaged with one of the wedge teeth 50 whereas a diametrically opposite tapered shaft 62 in the lower portion of the figure is fully engaged with one of the wedge teeth 60. The wedge teeth 50, 60 and the tapered shafts 62 may be so arranged that, for example, in the upper portion of the figure five wedges 50 and five shafts will be engaged simultaneously whereas in the lower portion of the figure five other shafts 62 and five wedges 60 will be engaged simultaneously. Thus the total driving force imparted from the nutating drive member 44 to the parts 48 and 52 of the driven member will be widely distributed or divided. Not only will there be a total of ten wedges 50, 60 engaged at any one time, but these engaged wedges will be divided into two groups located at diametrically opposite points or areas with respect to the axis of the transmission. Thus, the organization as above set forth provides a balanced-force transmission unit wherein approximately half of the driving force is imparted through the wedge teeth 50 to the part 48 of the driven member and the remaining half is imparted through the wedge teeth 60 to the second part 62 of the driven member. This is in sharp contrast to prior speed change transmissions where no such balance or division of the driving forces is effected.

In accordance with the invention a novel retainer or holding means of greatly reduced friction and enhanced simplicity is provided to prevent turning movement of the drive member 44 while permitting the latter to have the required orderly cyclic wobbly motion as effected by the oblique drive hub 50 and the anti-friction bearing assemblage 42. The said retainer or holding means comprises a pair of coaxial, axially spaced, stationary holding plates or disks 72 and 74 having generally the form of annuli since there are large central openings, the member 72 being mounted by means of an anti-friction bearing assemblage 76 on a portion of the drive shaft 12 for relative movement with respect thereto. The retainer or holding member 74 is secured to the inner hub portion 58 of the end plate 15 by a plurality of tie bolts 78 which pass through the said end plate. The tie bolts 78 extend through clearance openings 80 in the drive member 44 and mount the stationary holding plate 72 at a location adjacent the part 48 of the driven member. Thus, the holding plates or members 72 and 74 are coaxial with each other and are axially spaced, with the nutating drive member 44 located between them. The holding plates 72 and 74 have undulating faces formed by sets of crests and troughs provided with a formation similar to a sine wave, the said crests and troughs being indicated by the numerals 84 and 86 respectively. As an example, each of the holding plates 72, 74 may have a total of 12 crests and 12 troughs. For cooperation with the said wave-like configurations or faces comprising the crest and troughs 84 and 86 of the holding plates 72 and 74, cooperable or complementary sets of circularly arranged crest and trough formations 88 and 90 which are disposed back-to-back are provided on the nutating drive member 44. Preferably, as shown, the said crest and trough formations are carried by rings or annuli 92 and 94 respectively, which are secured in any suitable manner to opposite sides of the drive member 44.

Since the holding members 72 and 74 are at all times stationary or rigid with the casing 10, turning of the drive shaft 12 in the casing 10 will cause the nutating drive member 44 to have a rolling engagement with the holding plates 72 and 74 while at the same time the latter prevents turning movement of the drive member.

An important feature of the said retainer or holding means for the drive member 44 resides in the fact that it is characterized by balanced, diametrically opposite holding forces which are being applied to the drive member as the latter is given the cyclic wobbly motion. As seen in FIG. 1, the upper portion of the drive member 44 is retained against rotation by the left holding member 72 whereas the lower portion of the said drive member is simultaneously held against turning by the right holding member 74. The balanced holding forces as thus effected, in conjunction with the balanced driving forces explained above, result in an extremely smooth acting transmission wherein excessive concentrations of force are avoided and instead the necessary operating forces are distributed to the greatest possible extent and also arranged so that they exist at any instant, equally on both or opposite sides of the axis of the transmission. Greater loads and speed may thus be handled by a transmission of given size. Because of the rolling action characterizing the engagement of the drive member 44 with the retainer members 72 and 74 virtually no sliding friction exists in carrying out the function of preventing turning of the drive member. Also, the said rolling action is devoid of adverse inertia effects which are present where turning parts, components or rollers must be quickly reversed in their turning movements. The casing 10 may be supplied with a suitable lubricant, as is readily understood.

It will now be understood from the foregoing that the improved speed changing transmission as provided by the invention may be of relatively small size, both as regards its diameter and its axial dimension. Moreover, the organization is extremely compact and saving of space, and by virtue of the balancing of the driving and holding forces, concentrations of forces are avoided whereby smaller sections may be depended on to carry a given load and to operate at a given speed. Since the anti-friction means arranged between the driving member 44 and the driven parts 48, 52 are provided on the driving member and not on the two parts of the driven member, the total number of anti-friction bearing assemblages is reduced. It may be noted in this connection that the wedge teeth 50, 60 are not by themselves depended on to reduce the friction. Further, because of the rolling action existing between the retainer members 72, 74 and the rings 92, 94, no anti-friction bearing assemblages are required at this point, since the rolling engagement is, in itself, of an anti-friction nature.

Variations and modifications may be made within the scope of the claims, and portions of the improvement may be used without others.

I claim:

1. In a balanced force speed changer, an exterior housing a pair of coaxial, axially spaced rotary driven members in the housing connected with each other to have concurrent turning movement and each having an identical set of circumferentially spaced driven faces disposed in circles; a non-turning wobble-type driving member disposed in the housing between and cooperable with the said driven members and having a set of circumferentially spaced inclined driving faces also disposed in a circle and adapted to cooperate simultaneously with both sets of said driven faces at locations spaced 180° apart at all times, the number of driven faces in each set being the same and differing from the number of driving faces by a small number; means including a shaft in the housing, for imparting an orderly cyclic wobbly motion to the driving member to cause sequential engagement between the faces of all of the said sets whereby the driven members are rotatably advanced as the driving member wobbles without rotation; and holding means in and rigid with the housing and engaged with the driving member, enabling the same to have the said wobbly motion while holding it against turning with respect to the housing, said holding means comprising an annulus disposed radially inward of the driven faces of at least one of the said driven members and having crests and troughs disposed in a circle, and further comprising crests and troughs on the driving member, cooperable with those of the annulus, and further comprising a connector device disposed radially outward of the said shaft, connecting the annulus to the said housing.

2. A speed changer as in claim 1, wherein the driving member includes a series of tapered anti-friction rollers having the said inclined driving faces, said rollers having axes which are radially disposed on the driving member.

3. A speed changer as in claim 2, wherein the said rollers comprise short tapered shafts, and wherein the driving member has pairs of aligned bearings comprising anti-friction roller elements, supporting both ends of the tapered shafts.

4. A speed changer as in claim 1, wherein the said driven members individually are rotatably carried by and in the housing.

5. A speed changer as in claim 1, wherein the means for imparting wobbly motion comprises an oblique hub disposed in the housing and carried by said shaft, the latter being rotatably carried by the housing.

6. A speed changer as in claim 5, wherein the said shaft is also rotatably carried by and in the said annulus.

7. A speed changer as in claim 6, wherein the said shaft is also rotatably carried by and in one of the said driven members.

8. A speed changer as in claim 1, wherein one of the driven members comprises a shaft rotatably carried by and in the housing.

9. In a balanced force speed changer, a pair of coaxial, axially spaced rotary driven members connected with each other to have concurrent turning movement and each having an identical set of circumferentially spaced driven faces disposed in circles; a non-turning wobble-type driving member disposed between and cooperable with the said driven members and having a set of circumferentially spaced inclined driving faces also disposed in a circle and adapted to cooperate simultaneously with both sets of said driven faces at locations spaced 180° apart at all times, the number of driven faces in each set being the same and differing from the number of driving faces by a small number; means for imparting an orderly cyclic wobbly motion to the driving member to cause sequential engagement between the faces of all of the said sets whereby the driven members are rotatably advanced as the driving member wobbles without rotation; and holding means engaged with the driving member, enabling the same to have the said wobbly motion while holding it against turning, said holding means comprising a stationary annulus having crests and troughs disposed in a circle and located radially inward of the driven faces of one of the two said sets, and comprising a set of cooperable circularly disposed crests and troughs on the driving member which are sequentially engageable with the crests and troughs of said stationary annulus as the driving member nutates.

10. A speed changer as in claim 9, wherein the holding means further comprises a second stationary annulus having crests and troughs disposed in a circle and located radially inward of the driven faces of the other of the two said sets, and comprises a second set of circularly disposed crests and troughs on the driving member, arranged back-to-back with the other crests and troughs of said member and sequentially engageable with the crests and troughs of said second annulus, said annuli being coaxial and axially spaced and the driving member being disposed between the annuli.

11. A speed changer as in claim 10, wherein the said crests and troughs follow substantially a sine wave.

References Cited in the file of this patent

UNITED STATES PATENTS

| | | |
|---|---|---|
| 1,611,981 | Amberg | Dec. 28, 1926 |
| 2,144,110 | Herrick | Jan. 17, 1939 |
| 2,871,382 | Bouvier | Jan. 27, 1959 |